Figure 1:
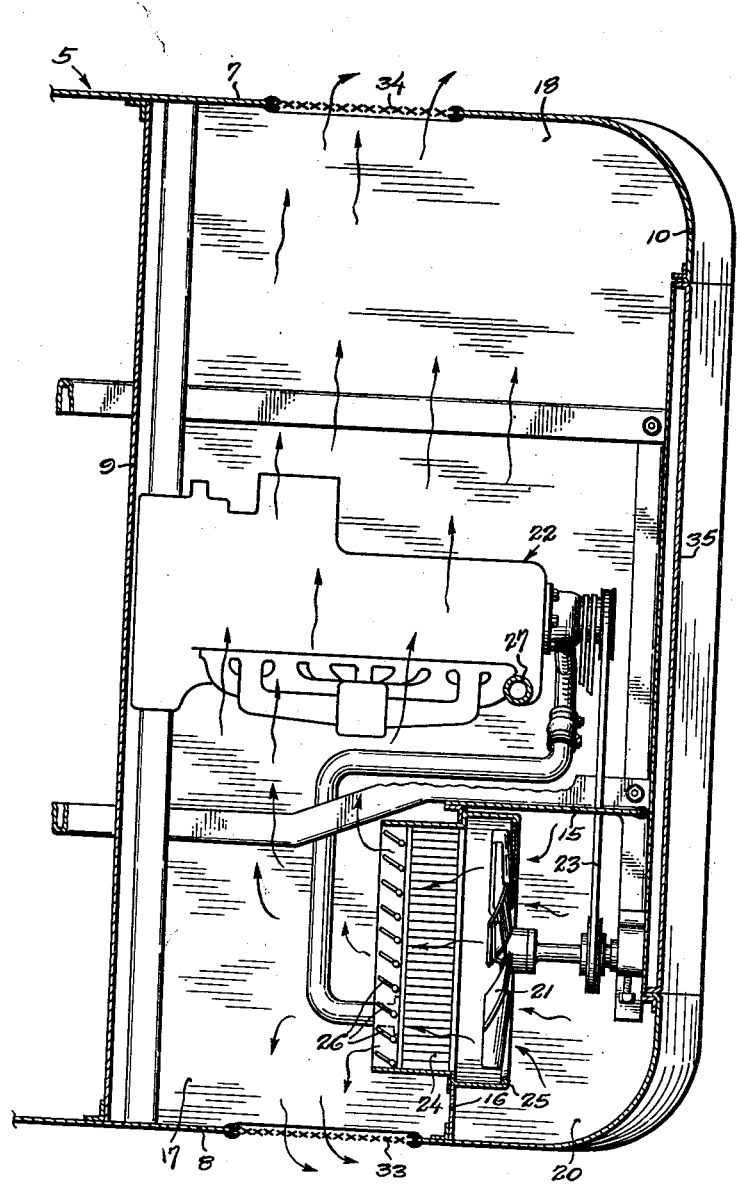

INVENTOR.
Leslie R. Dafoe

June 8, 1954

L. R. DAFOE 2,680,490

COOLING SYSTEM FOR REAR-END POWER PLANTS

Filed Oct. 3, 1950

3 Sheets-Sheet 3

INVENTOR.
Leslie R. Dafoe
BY

Patented June 8, 1954

2,680,490

UNITED STATES PATENT OFFICE 2,680,490

COOLING SYSTEM FOR REAR-END POWER PLANTS

Leslie R. Dafoe, Seattle, Wash., assignor to Kenworth Motor Truck Corporation, Seattle, Wash., a corporation of Washington Application October 3, 1950, Serial No. 188,259

10 Claims. (Cl. 180—54)

This invention relates to cooling systems for rear-end power plants, and which is to say engines which are mounted at the rear end of an automotive vehicle. Bus manufacturers in particular favor a location of the engine at the rear end but there has not been heretofore developed a fully satisfactory system for cooling the engines. The power plants used are of the water-jacketed type used in conjunction with an air-cooled radiator, and aside from assuring an ample supply of air to perform the necessary function of dissipating heat from the water circulating through the core of the radiator it becomes highly important with rear-end engines that the system be so engineered that the compartment which houses the engine be maintained in a dust-free condition. Dust within the engine compartment, in addition to causing abrasive wear upon such moving parts of an engine or its accessories as are exposed, becomes a serious fire hazard in that the same creates an inflammable film by its absorption of gas and oil fumes.

In considering this matter of road dust, it is self-evidently important as a starting premise that air sucked by action of the fan into the engine compartment be itself comparatively free of dust. However, unless the amount of dust is material, if air can be kept moving through the engine compartment the dust carried thereby will be carried with the air through the discharge opening which the compartment necessarily provides. The more troublesome problem is the matter of preventing road dust from entering the engine compartment through the discharge opening. As long as there is maintained within the engine compartment a condition of pressure higher than that which obtains outside the discharge opening substantially no dust can be expected to enter through this opening. By this token the simple answer might seemingly be one of deleting the radiator shutters which are now commonly employed and continuing to blow air at all times through the compartment but this is objectionable in that shutters are a practical necessity in cold weather and are also important in allowing a cold engine to rapidly attain a heat sufficient for maximum operating efficiency.

The present invention has for its objects the provision of a system for cooling rear-end engines which is of generally advanced design over cooling systems previously devised, and particularly to provide a system which will assure, during seasons when dust is prevalent, the maintaining within the engine compartment of a pressure condition high by comparison with outside pressure without, in so doing, dropping the heat of the engine below the efficiency range.

With these and other objects and advantages in view and which, with the foregoing, will appear and be understood in the course of the following description and claims, the invention consists in the novel construction and in the adaptation and combination of parts hereinafter described and claimed:

In the accompanying drawings:

Figure 1 is a fragmentary horizontal sectional view of the rear end portion of a bus incorporating a cooling system constructed in accordance with the preferred teachings of the present invention.

Figure 2:
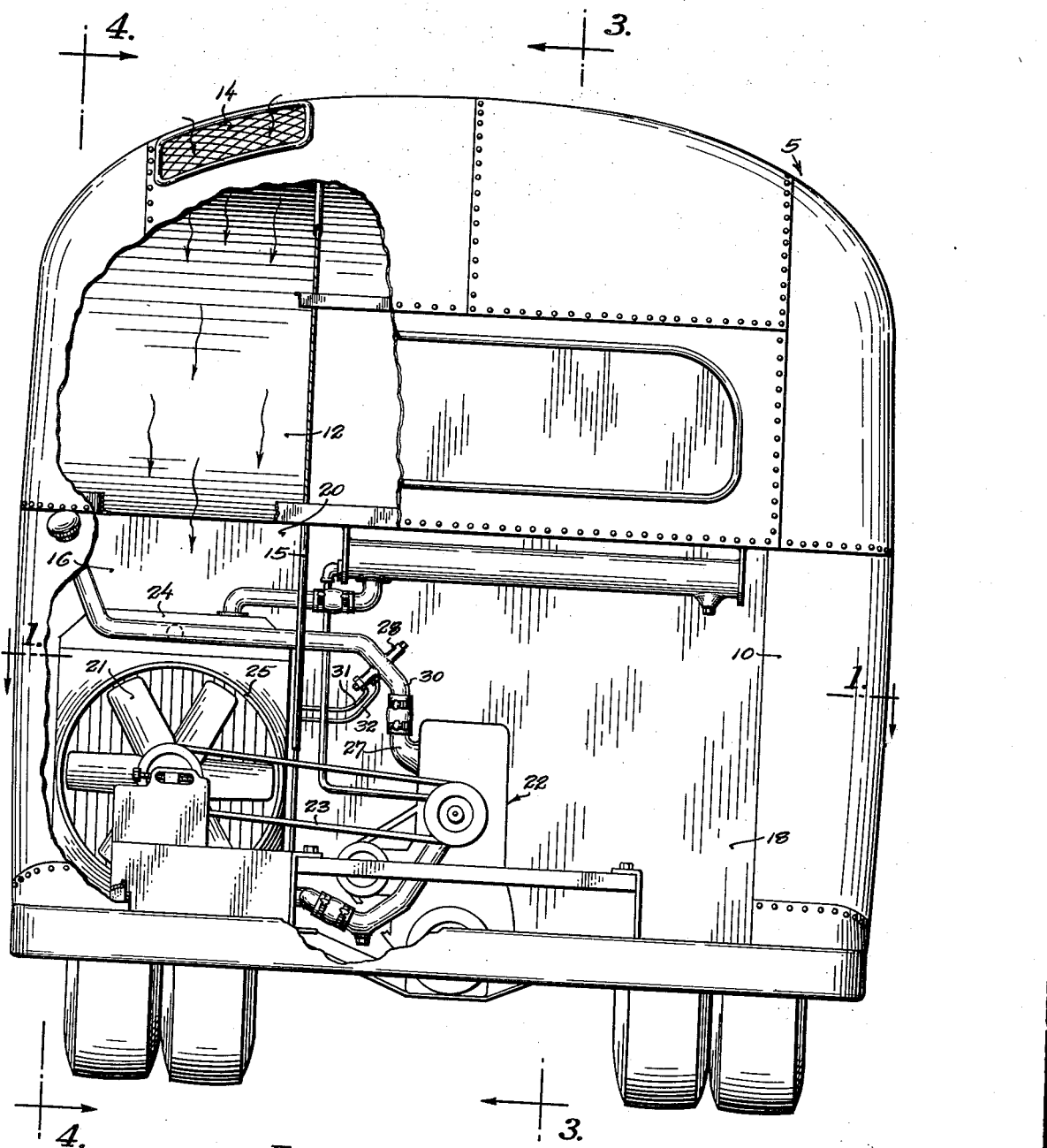
Figure 4:
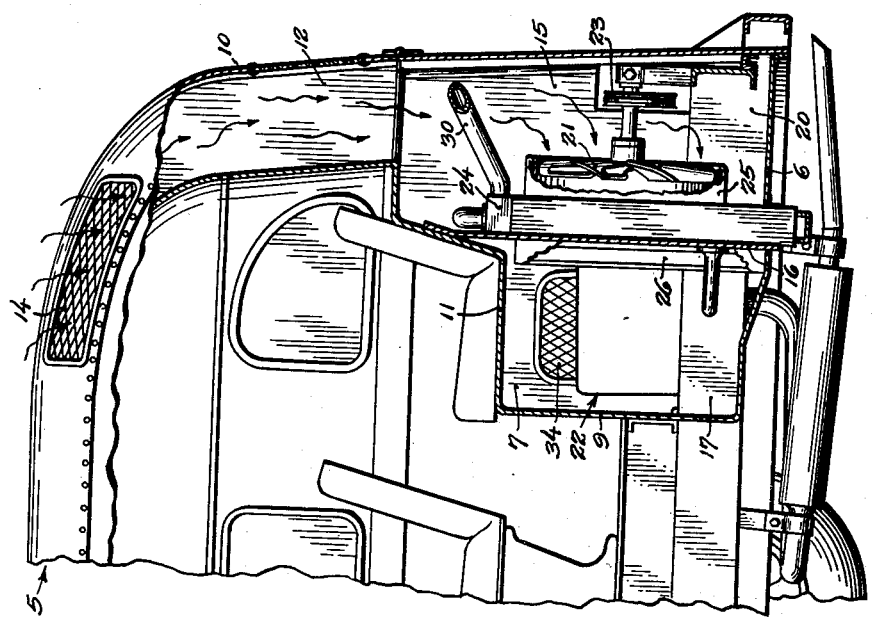
Figure 3:
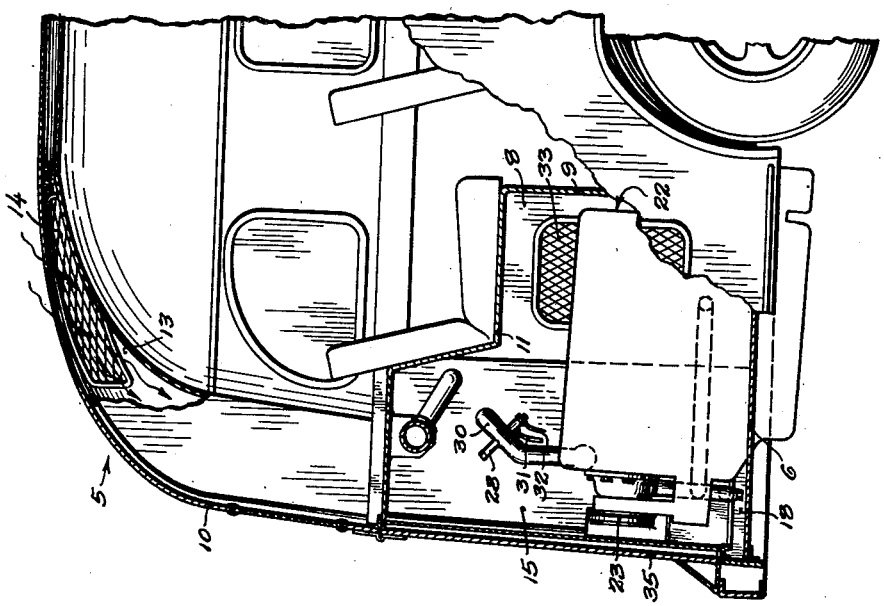

Fig. 2 is a rear elevational view thereof deleting the hinged door which gives access to the engine compartment and also breaking away such portion of the skin of the body as will allow salient parts of the invention to be shown in full lines; and Figs. 3 and 4 are fragmentary longitudinal vertical sectional views drawn to a reduced scale on lines 3—3 and 4—4, respectively, of Fig. 2.

Referring to said drawings the bus to which the present invention is applied and which I designate generally by the numeral 5 has the usual passenger compartment with multiple seats, and at the rear end of the vehicle there is provided a separate compartment lying partly behind and partly below the rearmost seats. The entire compartment is closed at the bottom by a floor wall 6 and about the sides and ends by walls 7—8 and 9—10, respectively, and excepting for a rear-corner portion is also closed at the top by a ceiling wall 11. Above the corner portion there is provided a vertical air tunnel which extends upwardly by a main trunk 12 and thence forwardly by a gradually diminishing throat 13 to the roof limit of the bus whereat the same is exposed to the outside atmosphere by an opening 14 fitted with the usual screening grill. This said corner portion, within the compartment proper, is set apart from the balance of the compartment by the two wall sections 15 and 16 of an angular partition, leaving to the front of the partition an alley 17 and to the side thereof a comparatively large chamber 18. Designated by 20 the corner chamber houses a fan 21, and housed within the chamber 18 is the water-jacketed engine 22 which serves as the power plant for the bus. Both the engine and the fan desirably are mounted to locate their axes parallel to the longitudinal median line of the bus, and driven off the engine and driving said fan there is provided a belt 23 working through a small opening which is cut in the intervening longitudinal wall section 15 of the angular partition.

The other and transverse wall section 16 of said partition has a comparatively large opening therein, and fitted in this opening to occupy a position immediately to the front of the fan is a radiator 24 to which is attached a shroud 25 for directing the fan-blown column of air through the core. Associated with the radiator and mounted upon that side of the core which is exposed to the alley 17 there is provided a set of shutters 26 pivotally mounted for opening and closing movements and activated in any desired manner, preferably by means of a piston working in an air cylinder and giving reciprocal movement to a sliding bar which connects through crank arms with the several shutters. The large majority of trucks, and busses in particular, include as their accessory equipment an engine-driving air compressor for the brake system, and hence it becomes desirable to employ pressure air as the instrumentality for operating the radiator shutters.

It is common practice to have the radiator shutters open and close in concert with the opening and closing of a thermostat which opens the engine jackets for circulation of water pumped through the radiator system. To avoid dust, for reasons which will be hereinafter expressly pointed out, this is objectionable in the instance of a rear-end engine, and it is a feature of the present invention that the valve which controls the operation of the shutters, while it is made automatically responsive to temperature conditions within the water-circulating system, operates by a condition differing from that which opens the water jackets. To this end I employ two separate thermostats. One said thermostat, hereinafter referred to as the by-pass thermostat, is contained within a pipe section 27 and is the usual thermostat acting by its closing to trap engine water against circulation through the radiator. This thermostat commonly is set to open at 175° F. a temperature condition approximating the low point of the engine's efficiency range. The other said thermostat, and which I will hereinafter refer to as a shutterstat, is designated by 28 and lies beyond the pipe section 27 in a connecting pipe 30 leading to the upper end of the radiator. As applied to a set of shutters activated by pressure air, a suitable shutterstat for my purpose is one associated with a control valve governing the movement of pressure air through two pipes 31 and 32 connecting with the air cylinder for the shutters. Beyond the necessary characteristic of being set to open at a temperature well below that of the by-pass thermostat, say a temperature 25° lower, the structural nature of the shutterstat is, however, unimportant.

The pressure column of air drawn by the suction of the fan through the roof opening 14 and blown through the core of the radiator into the engine compartment is discharged through two openings, as 33 and 34, each fitted with a grill and located one in the outer wall of the alley 17 and the other in the oppositely disposed outer wall 7 of the engine chamber 18. There is also provided at the rear of the bus a hinged door 35 giving access to both the engine chamber and the fan chamber and arranged, when closed, to tightly seal the interior of the rear-end compartment against liability of the rather heavily laden air which swirls up from the rear wheels seeping into the compartment.

From the foregoing description it will be apparent that the zone from which I draw air into the fan chamber is comparatively free of dust and as long as the shutters remain open this air column is blown into the alley and thence moves in opposite directions to spill out the two side openings 33 and 34. In prior arrangements, the shutters have been made responsive to the engine thermostat wherefor the same close as the temperature of the water drops below the efficiency range. Such a drop in temperature will perforce occur whenever the engine is relieved of its load while the bus is under way as, for example, when running down hill, and it therefor follows that a shutter, when controlled by a thermostat set to close at the low point of the efficiency range, will be closed at frequent intervals during the normal running of the bus. When so closed, and as distinguished from the high pressure condition developed within the engine compartment when the fan is blowing air through the same, there obtains a low-pressure condition and it is this low-pressure condition which permits road dust to enter the compartment through the discharge opening. The degree to which the discharge opening sucks dust-laden air depends in large extent upon the design of the compartment, and particularly the location of the discharge opening. The perfected design of the present invention is quite advantageous in this respect in that two discharge openings located opposite one another in the side walls of the bus minimize suctional pull within the compartment but there still remains a sufficient pull to draw some dust if the shutters are closed. My employment of a shutterstat separate and apart from the engine thermostat and set to close at 150° F. assures, during the hot seasons when dust is a problem, an open condition of the shutters at very nearly all times while the vehicle is under way. While the engine is being warmed up preparatory to starting a run, and also during winter months, there is no problem insofar as dust is concerned.

The structural design of the system as a whole, the arrangement of its parts, and the manner of their working are believed clear from the foregoing detailed description having express reference to my now preferred embodiment. Some changes in the details of construction may be resorted to without departing from the spirit of the invention and I accordingly intend that the hereto annexed claims be given a breadth in their interpretation fully commensurate with the broadest scope to which the employed language admits.

What I claim is:

1. In a bus, a body presenting a compartment at the rear divided by a partition into two separated chambers with an opening being provided in the partition to establish communication between the two chambers, and having a tunnel for incoming air leading into one of said chambers, the other said chamber extending the full width of the body and having openings for the discharge of air provided in each of the opposite side walls, a water-jacketed engine housed in said full-width chamber and serving as the power plant for the bus, an engine-driven fan housed in the other chamber and operating to draw air from the chamber and force the same through said communication opening into the engine chamber, a radiator for the engine having its core overlying said communication opening, said radiator being fitted with shutters acting by an opening thereof to establish communication between the two chambers and by a closing thereof to shut off one from the other said chamber, and means interconnected with the shutters for controlling the opening and closing of said shutters.

2. The structure of claim 1 having means by which the radiator and the jackets of the engine are brought into water-circulating connection only as the engine heat reaches a given efficiency range, and wherein the controlling means operates automatically in response to the temperature condition of the engine and causes the shutters to open under a condition of engine heat somewhat lower than the low point of said efficiency range.

3. In a bus, a body presenting a compartment at the rear divided by a partition into two separated chambers with an opening being provided in the partition to establish communication between the two chambers, and having an air tunnel leading into one of said chambers from a roof opening exposed to the outside atmosphere, the other said chamber extending the full width of the body and having openings for the discharge of air provided in each of the opposite side walls, a water-jacketed engine housed in said full-width chamber and serving as the power plant for the bus, an engine-driven fan housed in the other chamber and operating to draw air from the tunnel and force the same through said communication opening into the engine chamber, and a radiator for the engine having its core overlying said communication opening, means being provided by which the radiator and the jackets of the engine are brought into water-circulating connection only as the engine heat reaches a given efficiency range, said radiator being fitted with thermostatically controlled shutters which are made to open under a condition of engine heat approximately 25° below the low point of said efficiency range.

4. The structure of claim 3 in which said means brings the radiator and the jackets of the engine into water-circulating connection only as the engine heat reaches an approximate 175° F. temperature, and wherein the thermostatically controlled shutters are made to open under a condition of engine heat approximating 150°.

5. In a vehicle having separate engine and fan compartments connected by a communication opening and providing an air-admission opening to the fan compartment and an air-discharge opening from the engine compartment, a water-jacketed engine serving as the power plant for the vehicle and housed in the engine compartment, a fan housed in the fan compartment and driven off the engine to draw air from the air-admission opening and force the same through the communication opening into the engine compartment, a water-cooling radiator having its core overlying said communication opening, connections between the radiator and the engine thermostatically controlled to permit water to circulate from the radiator through the jackets of the engine only when the temperature condition of the engine is above the low point of a given efficiency range, a shutter for the core of the radiator, and means controlled thermostatically by means independent of said first-named thermostatic control to cause the shutters to close only when the temperature of the engine drops somewhat below said low point of the efficiency range.

6. In a bus, a body presenting a compartment at the rear divided by a partition into two separated chambers with an opening being provided in the partition to establish communication between the two chambers, and having a tunnel for incoming air leading into one of said chambers from a roof opening exposed to the outside atmosphere, the other chamber having a wall opening likewise exposed to the outside atmosphere for discharge of air, a water-jacketed engine serving as the power plant for the bus and housed in the last-named chamber, a radiator positioned to locate its core in overlying relation to said opening in the partition, means operating to establish circulation of cooling water through the engine jackets to and from the radiator only when the temperature condition of the engine is within a predetermined range of efficient operation, an engine-driven fan housed in the first-named chamber for forcing air from the tunnel through the core of the radiator into the engine chamber, a shutter for the radiator core, means for opening and closing said shutter, and means made responsive to engine temperature and acting to control said shutter-operating means such that the shutter opens under a condition of engine heat approximately 25° F. lower than the low point of said efficiency range.

7. In a bus, a body presenting a compartment at the rear extending the full width of the body and having a rear corner portion set apart from the balance of the compartment by an angular partition, a fan housed in said corner portion of the compartment, a water-jacketed engine housed in the other or main portion of the compartment, an opening in the rear wall of the compartment giving access to both the fan chamber and the engine chamber, a closure for said opening, a communication opening between the chambers, a radiator having water-circulating connection with the jackets of the engine and mounted to have its core overlie said communication opening, an air tunnel leading into the fan chamber from a roof opening exposed to the outside atmosphere, and air-discharge openings in each of the opposite side walls of the engine chamber likewise exposed to the outside atmosphere.

8. In a bus, a body presenting a compartment at the rear extending the full width of the body and having a rear corner portion set apart from the balance of the compartment by an angular partition, a fan housed in said corner portion of the compartment, a water-jacketed engine housed in the other or main portion of the compartment, an opening in the rear wall of the compartment giving access to both the fan chamber and the engine chamber, a closure for said opening, a communication opening between the chambers, a radiator having water-circulating connection with the jackets of the engine and mounted to have its core overlie said communication opening, an air tunnel leading into the fan chamber from an opening exposed to the outside atmosphere, and an air-discharge opening from said main portion of the compartment likewise exposed to the outside atmosphere.

9. In a bus, a body presenting a compartment at the rear divided by a separating partition into a fan chamber and an engine chamber with an opening being provided in the partition to establish communication between the two chambers, and also providing for said chambers a respective opening one for admission of air to the fan chamber and the other for the discharge of air from the engine chamber, a water-jacket engine housed in said engine chamber and serving as the power plant for the bus, an engine-driven fan housed in the fan chamber and operating to draw air from the air-admission opening and force the same through said communication opening into the engine chamber, and a radiator for the engine having its core overlying said communication opening, means being provided by which the radiator and the jackets of the engine are brought into water-circulating connection only as the engine heat reaches a given efficiency range, said radiator being fitted with thermostatically controlled shutters which are made to open under a condition of engine heat approximating 25° below the low point of said efficiency range.

10. In a vehicle having an engine compartment providing openings for the admission thereto and the discharge therefrom of a column of cooling air, a water-jacketed engine serving as the power plant for the vehicle and housed in the engine compartment, a water-cooling radiator having its core overlying said admission opening, a normally open shutter for the admission opening, a power-driven fan operatively associated with the radiator and acting when the shutter is in said normal open condition to cause a pressure column of air to pass through the engine compartment entering through said admission opening and leaving through said discharge opening, connections between the radiator and the engine governed by a thermostatic control so as to permit water to circulate from the radiator through the jackets of the engine only when the temperature condition of the engine is above the low point of a given efficiency range, and namely a range in which the engine is intended to function under normal operating conditions when the same is powering the vehicle, and means controlled thermostatically by means independent of said first-named thermostatic control to cause the shutter to close only when the temperature of the engine drops somewhat below said low point of the efficiency range.

References Cited in the file of this patent

UNITED STATES PATENTS

| Number | Name | Date |
|---|---|---|
| 1,849,008 | Hutchinson et al. | Mar. 8, 1932 |
| 2,047,336 | Stout | July 14, 1936 |
| 2,083,059 | Fageol | June 8, 1937 |
| 2,092,040 | Aitken | Sept. 7, 1937 |